United States Patent
Kitchens et al.

(10) Patent No.: US 10,706,306 B2
(45) Date of Patent: Jul. 7, 2020

(54) SPOOF AND LIVENESS DETECTION VIA PYROELECTRIC INDICATIONS

(71) Applicant: QUALCOMM Incorporated, San Diego, CA (US)

(72) Inventors: Jack Conway Kitchens, Buffalo, NY (US); John Keith Schneider, Williamsville, NY (US); Evan Michael Breloff, Kenmore, NY (US); Stephen Michael Gojevic, Lockport, NY (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 16/208,424

(22) Filed: Dec. 3, 2018

(65) Prior Publication Data
US 2020/0175291 A1 Jun. 4, 2020

(51) Int. Cl.
*G06K 9/00* (2006.01)

(52) U.S. Cl.
CPC ....... *G06K 9/00906* (2013.01); *G06K 9/0002* (2013.01); *G06K 9/00087* (2013.01); *G06K 9/00114* (2013.01)

(58) Field of Classification Search
CPC ............ G06K 9/0002; G06K 9/00107; G06K 9/00114; G06K 9/00906; G06K 9/00087
See application file for complete search history.

(56) References Cited

U.S. PATENT DOCUMENTS

| | | | |
|---|---|---|---|
| 2014/0354597 A1* | 12/2014 | Kitchens, II | G06K 9/0002 345/175 |
| 2016/0070967 A1* | 3/2016 | Du | G06K 9/00093 382/124 |
| 2017/0231534 A1* | 8/2017 | Agassy | G06K 9/00107 382/124 |
| 2018/0101711 A1* | 4/2018 | D'Souza | G06K 9/0002 |

* cited by examiner

*Primary Examiner* — Chih-Cheng Kao
(74) *Attorney, Agent, or Firm* — Weaver Austin Villeneuve & Sampson LLP

(57) ABSTRACT

An apparatus may include an ultrasonic sensor system and a control system. The control system may be configured to distinguish, according to image data acquired via an ultrasonic sensor system, the pyroelectric effect caused by an actual human finger from the pyroelectric effect caused by a sleeve-type spoof or a "fake finger" spoof. Some such examples involve obtaining multiple frames of ultrasonic image data of a target object on or near a platen of an ultrasonic sensor system via the ultrasonic sensor system and determining at least one target object pyroelectric indication based, at least in part, on the multiple frames of ultrasonic image data.

30 Claims, 10 Drawing Sheets

SPOOF AND LIVENESS DETECTION VIA PYROELECTRIC INDICATIONS

TECHNICAL FIELD

This disclosure relates generally to biometric devices and methods, including but not limited to ultrasonic sensor systems and methods for using such systems.

DESCRIPTION OF THE RELATED TECHNOLOGY

Technically savvy hackers revel in defeating the latest technical security innovations. For example, premium tier mobile phone manufacturers have had their first smartphones that incorporated fingerprint-based authentication systems successfully hacked shortly after product introduction. In some instances, spoofing may involve using a finger-like object that includes silicone rubber, polyvinyl acetate (white glue), gelatin, glycerin, etc., with a fingerprint pattern of a rightful user formed on an outside surface. In some cases, a hacker may form a fingerprint pattern of a rightful user on a sleeve or partial sleeve that can be slipped over or on the hacker's finger. Either type of device may be referred to herein as a "spoof."

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include a control system and an ultrasonic sensor system that includes piezoelectric material and a platen. At least part of the control system may be configured for electrical communication with the ultrasonic sensor system. In some implementations, a mobile device may be, or may include, the apparatus. For example, a mobile device may include an apparatus as disclosed herein.

The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured for determining that a target object is proximate a platen of an ultrasonic sensor system that includes piezoelectric material and for controlling the ultrasonic sensor system to obtain N frames of ultrasonic image data, where N is an integer. The N frames may include ultrasonic image data corresponding to the target object.

The control system may be configured for determining at least one target object pyroelectric indication based, at least in part, on the N frames of ultrasonic image data, for retrieving at least one stored pyroelectric indication from a memory, for performing a pyroelectric indication comparison between the target object pyroelectric indication and at least one stored pyroelectric indication, and for determining whether the target object is a digit of a living person or a spoof based, at least in part, on the pyroelectric indication comparison. In some instances, the control system may be further configured for subtracting a background image and/or a first frame image from second through Nth frames of ultrasonic image data.

According to some examples, the control system may be configured for taking one or more actions based on determining whether the target object is a digit of a living person or a spoof. For example, if the control system determines that the target object is a spoof, the control system may be configured to provide an audio alert, via the interface system and one or more speakers. In some examples, if the control system determines that the target object is a spoof, the control system may be configured to provide a visual alert, via the interface system and a display device. According to some examples, if the control system determines that the target object is a spoof, the control system may be configured to send an alert, via the interface system, to one or more other devices. In some examples, if the control system determines that the target object is a spoof, the control system may be configured to disable at least some functionality of the apparatus, or of another apparatus, and/or to deny access to the apparatus, or to another apparatus.

In some examples, the target object pyroelectric indication may correspond to a number of pixels in each of the N frames of ultrasonic image data, the number of pixels corresponding to signals that are above a threshold value. According to some examples, the target object pyroelectric indication may correspond to a slope (e.g., a normalized slope) of an accumulated number of pixels in each of the N frames of ultrasonic image data. The number of pixels may, for example, correspond to signals that are above a threshold value. In some examples, the target object pyroelectric indication may correspond to a sum of a number of pixels in each of the N frames of ultrasonic image data. The number of pixels may, for example, correspond to signals that are above a threshold value.

Some such examples may involve determining, based on the ultrasonic image data, a "target object portion" of the N frames of ultrasonic image data that correspond to the target object. According to some examples, the target object pyroelectric indication may be based on the target object portion of the N frames of ultrasonic image data. In some such examples, the target object pyroelectric indication may be based on a mean signal value of pixels in the target object portion.

In some instances, N may be 2, 3, 4, 5, 6 or 7. However, in other implementations N may be an integer greater than 7. According to some examples, the N frames of ultrasonic image data may be obtained at time intervals of between 70 and 80 milliseconds. However, in other implementations the N frames of ultrasonic image data may be obtained during shorter or longer time intervals.

According to some implementations, the apparatus may include a temperature sensor configured for determining a platen temperature and/or an ultrasonic sensor system temperature. In some examples, the ultrasonic sensor system may include a temperature compensation module. The control system may be configured to switch off the temperature compensation module before obtaining the N frames of ultrasonic image data.

Other innovative aspects of the subject matter described in this disclosure can be implemented in a method. The method may involve determining that a target object is proximate a platen of an ultrasonic sensor system that includes piezoelectric material, controlling the ultrasonic sensor system to obtain N frames of ultrasonic image data, wherein N is an integer, and determining at least one target object pyroelectric indication based, at least in part, on the N frames of ultrasonic image data. The method may involve retrieving at least one stored pyroelectric indication from a memory, performing a pyroelectric indication comparison between the target object pyroelectric indication and at least one stored pyroelectric indication, and determining whether the target object is a digit of a living person or a spoof based, at least in part, on the pyroelectric indication comparison. In some instances, the method may involve subtracting a background image and/or a first frame image from second through Nth frames of ultrasonic image data.

In some examples, the target object pyroelectric indication may correspond to a number of pixels in each of the N frames of ultrasonic image data, the number of pixels corresponding to signals that are above a threshold value. According to some examples, the target object pyroelectric indication may correspond to a slope (e.g., a normalized slope) of an accumulated number of pixels in each of the N frames of ultrasonic image data. A normalized slope may be based, at least in part, on the platen temperature. The number of pixels may, for example, correspond to signals that are above a threshold value. In some examples, the target object pyroelectric indication may correspond to a sum of a number of pixels in each of the N frames of ultrasonic image data. The number of pixels may, for example, correspond to signals that are above a threshold value.

Some such examples may involve determining, based on the ultrasonic image data, a "target object portion" of the N frames of ultrasonic image data that correspond to the target object. According to some examples, the target object pyroelectric indication may be based on the target object portion of the N frames of ultrasonic image data. In some such examples, the target object pyroelectric indication may be based on a mean signal value of pixels in the target object portion.

In some instances, N may be 2, 3, 4, 5, 6 or 7. However, in other implementations N may be an integer greater than 7. According to some examples, the N frames of ultrasonic image data may be obtained at time intervals of between 70 and 80 milliseconds. However, in other implementations the N frames of ultrasonic image data may be obtained during shorter or longer time intervals.

According to some implementations, the method may involve determining a platen temperature and/or an ultrasonic sensor system temperature. In some examples, the method may involve switch off a temperature compensation module before obtaining the N frames of ultrasonic image data.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

For example, the software may include instructions for controlling one or more devices to perform a method. The method may involve determining that a target object is proximate a platen of an ultrasonic sensor system that includes piezoelectric material, controlling the ultrasonic sensor system to obtain N frames of ultrasonic image data, wherein N is an integer, and determining at least one target object pyroelectric indication based, at least in part, on the N frames of ultrasonic image data. The method may involve retrieving at least one stored pyroelectric indication from a memory, performing a pyroelectric indication comparison between the target object pyroelectric indication and at least one stored pyroelectric indication, and determining whether the target object is a digit of a living person or a spoof based, at least in part, on the pyroelectric indication comparison. In some instances, the method may involve subtracting a background image and/or a first frame image from second through Nth frames of ultrasonic image data.

In some examples, the target object pyroelectric indication may correspond to a number of pixels in each of the N frames of ultrasonic image data, the number of pixels corresponding to signals that are above a threshold value. According to some examples, the target object pyroelectric indication may correspond to a slope (e.g., a normalized slope) of an accumulated number of pixels in each of the N frames of ultrasonic image data. A normalized slope may be based, at least in part, on the platen temperature. The number of pixels may, for example, correspond to signals that are above a threshold value. In some examples, the target object pyroelectric indication may correspond to a sum of a number of pixels in each of the N frames of ultrasonic image data. The number of pixels may, for example, correspond to signals that are above a threshold value.

Some such examples may involve determining, based on the ultrasonic image data, a "target object portion" of the N frames of ultrasonic image data that correspond to the target object. According to some examples, the target object pyroelectric indication may be based on the target object portion of the N frames of ultrasonic image data. In some such examples, the target object pyroelectric indication may be based on a mean signal value of pixels in the target object portion.

In some instances, N may be 2, 3, 4, 5, 6 or 7. However, in other implementations N may be an integer greater than 7. According to some examples, the N frames of ultrasonic image data may be obtained at time intervals of between 70 and 80 milliseconds. However, in other implementations the N frames of ultrasonic image data may be obtained during shorter or longer time intervals.

According to some implementations, the method may involve determining a platen temperature and/or an ultrasonic sensor system temperature. In some examples, the method may involve switch off a temperature compensation module before obtaining the N frames of ultrasonic image data.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1A:
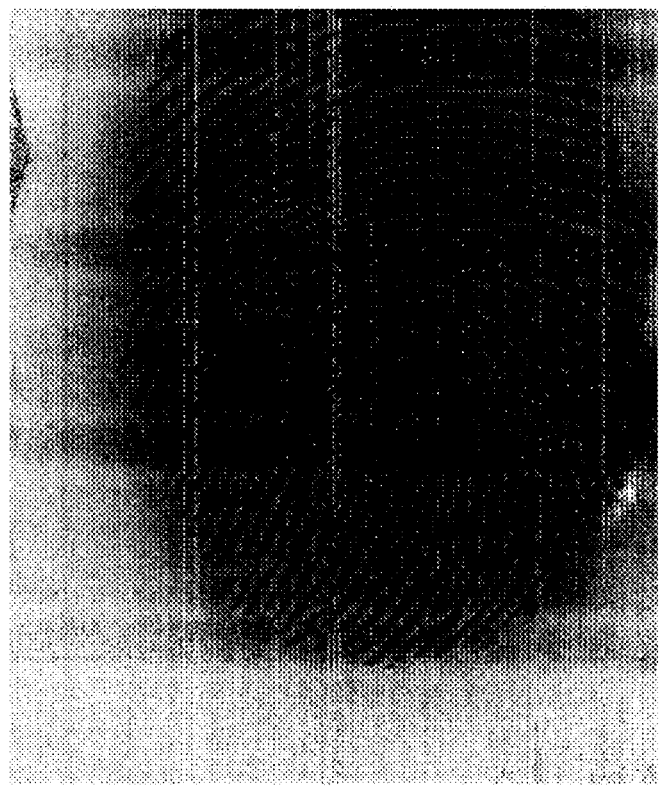
FIG. 1A shows an example of image data obtained from a finger in contact with a platen of an ultrasonic sensor system.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

The pyroelectric effect, or "pyroelectricity," is a property of some materials that are electrically polarized. Pyroelectricity refers to the ability of certain materials to generate a temporary voltage when they are heated or cooled. In some pyroelectric materials, a change in temperature can slightly modify positions of the atoms within the pyroelectric material, which can temporarily change the polarization of the material. The polarization change causes a voltage across the pyroelectric material. If the temperature remains constant at its new value, the pyroelectric voltage gradually disappears due to leakage current, which may be caused by electrons moving through the pyroelectric material, ions moving through the air, or current leaking through an electrical circuit attached to the pyroelectric material.

The pyroelectric effect complicates the process of obtaining fingerprint images, and other biometric images, via an ultrasonic sensor system. FIG. 1A shows an example of image data obtained from a finger in contact with a platen of an ultrasonic sensor system. In this example, the image data includes fingerprint data caused by reflections from ridge areas and valley areas of the finger. However, in FIG. 1A, the image data also includes the effect of a "thermal bloom" caused by the pyroelectric effect of the finger on piezoelectric material in the ultrasonic sensor system. Because the pyroelectric effect is so large, the reflections from fingerprint ridge and valley areas are difficult to discern in FIG. 1A.

Figure 1B:
FIG. 1B shows an example of the image data of FIG. 1A after subtracting the effect of the thermal bloom.

FIG. 1B shows an example of the image data of FIG. 1A after subtracting the effect of the thermal bloom. For example, a temperature compensation module of the ultrasonic sensor system may be configured to detect the temperature change and to apply a filter to the ultrasonic image data that compensates for the pyroelectric effect. The recorded signal contains signals caused by the piezoelectric and signals caused by the pyroelectric effect. The thermal signal is normally subtracted to eliminate the pyroelectric part of the signal, leaving only the piezoelectric part, in other words the ultrasonic sensing part. After compensating for the pyroelectric effect, reflections from fingerprint ridge and valley areas may be detected. Ultrasonic image data obtained from fingerprint valley areas corresponds to reflections from air/platen interfaces, whereas ultrasonic image data obtained from fingerprint ridge areas corresponds to reflections from skin/platen interfaces. Reflections from the fingerprint valley areas are generally higher in magnitude than reflections from the fingerprint ridge areas, because air/platen interfaces normally have a greater acoustic impedance contrast than skin/platen interfaces. However, in this example neither type of reflection is readily detectable before subtracting the effect of the thermal bloom.

Some disclosed implementations are configured to distinguish, according to image data acquired via an ultrasonic sensor system, the pyroelectric effect caused by an actual human finger from the pyroelectric effect caused by a sleeve-type spoof or a "fake finger" spoof. Some implementations may involve recording the pyroelectric signal and accumulating the pyroelectric signal over a small time period to determine the rate of heat transfer between the finger and the platen surface. The time period may, in some such implementations, be on the order of a few hundreds of milliseconds. Some such examples involve obtaining multiple frames of ultrasonic image data of a target object on or near a platen of an ultrasonic sensor system via the ultrasonic sensor system and determining at least one target object pyroelectric indication based, at least in part, on the multiple frames of ultrasonic image data.

In some examples, the target object pyroelectric indication may correspond to the number of pixels corresponding to signals that are above a threshold value. According to some such examples, the target object pyroelectric indication may correspond to a slope of an accumulated number of pixels corresponding to signals that are above the threshold value. In some such examples, the target object pyroelectric indication may correspond to a sum of a number of pixels corresponding to signals that are above the threshold value. In some such implementations, the temperature compensation module of the ultrasonic sensor system may be switched off while the multiple frames of ultrasonic image data are being obtained.

Particular implementations of the subject matter described in this disclosure may be implemented to realize one or more of the following potential advantages. As noted above, some spoofing techniques are based on forming fingerprint-like features on a spoof, which may be a finger-like object or a finger sleeve. However, some disclosed devices and methods can distinguish, according to image data acquired via an ultrasonic sensor system, the pyroelectric effect caused by a real finger from the pyroelectric effect caused by a spoof.

Figure 1C:
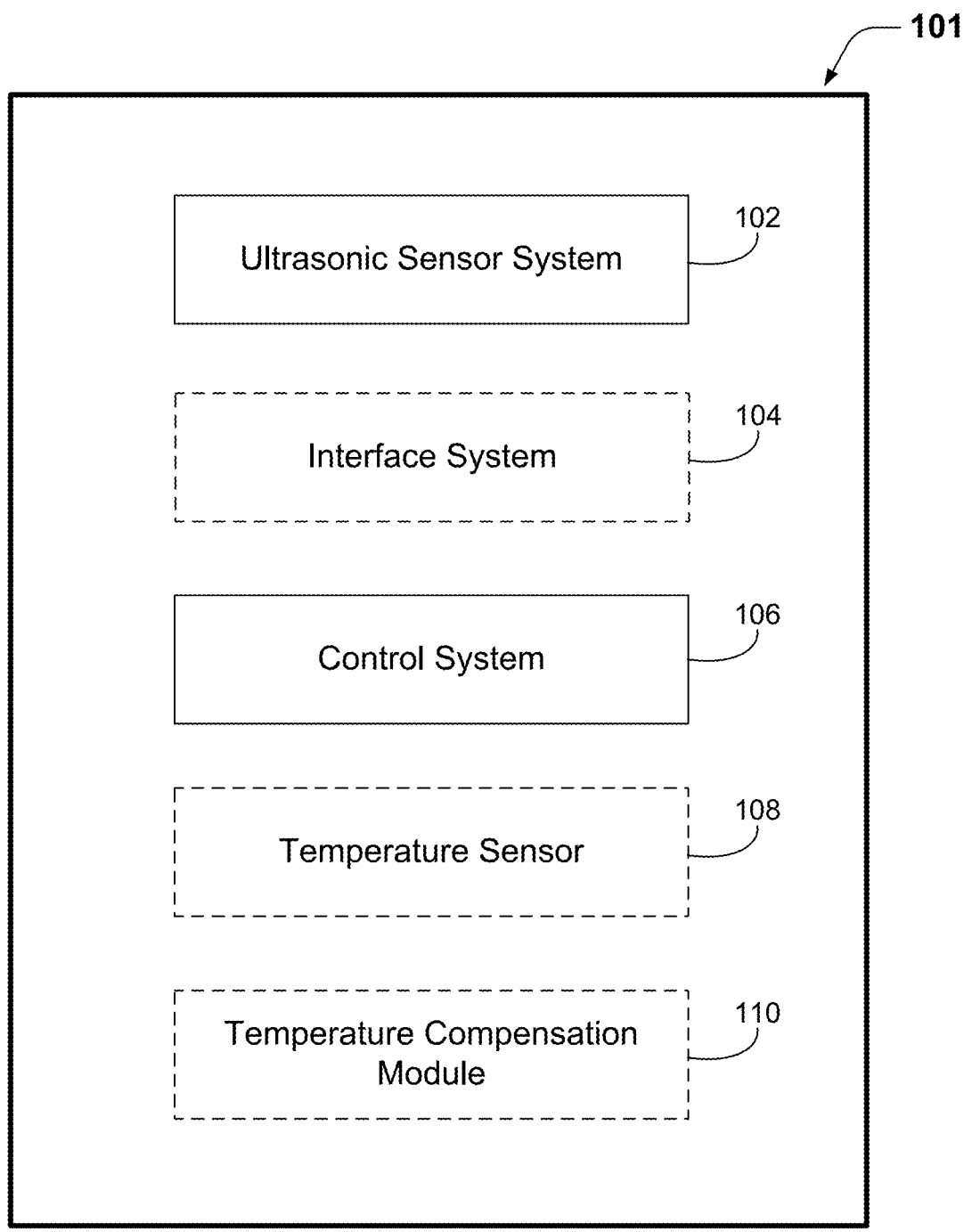
FIG. 1C is a block diagram that shows example components of an apparatus according to some disclosed implementations.

FIG. 1C is a block diagram that shows example components of an apparatus according to some disclosed implementations. In this example, the apparatus 101 includes an ultrasonic sensor system 102 and a control system 106. Although not shown in FIG. 1C, the ultrasonic sensor system 102 may include a platen that is configured to face the exterior of the apparatus 101. Some examples are described below. Some implementations of the apparatus 101 may include an interface system 104. In some examples, the apparatus 101 may include a temperature sensor 108 and/or a temperature compensation module 110. In some such examples, the temperature compensation module 110 may include an instance, or a portion of the temperature sensor 108.

Various examples of ultrasonic sensor systems 102 are disclosed herein, some of which may include a separate ultrasonic transmitter and some of which may not. For example, in some implementations, the ultrasonic sensor system 102 may include a piezoelectric receiver layer, such as a layer of PVDF polymer or a layer of PVDF-TrFE copolymer. In some implementations, a separate piezoelectric layer may serve as an ultrasonic transmitter. In some implementations, a single piezoelectric layer may serve as the transmitter and as a receiver. In some implementations, other piezoelectric materials may be used in the piezoelectric layer, such as aluminum nitride (AlN) or lead zirconate titanate (PZT). The ultrasonic sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers. According to some alternative examples, the ultrasonic sensor system 102 may include an ultrasonic receiver array and a separate ultrasonic transmitter may include one or more separate elements. In some such examples, the ultrasonic transmitter may include an ultrasonic plane-wave generator, such as those described below.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 101 may have a memory system that includes one or more memory devices, though the memory system is not shown in FIG. 1C. The control system 106 may be capable of receiving and processing data from the ultrasonic sensor system 102, e.g., as described below. If the apparatus 101 includes a temperature sensor 108, the control system 106 may be capable of performing one or more operations according to input from the temperature sensor 108, e.g., as disclosed elsewhere herein. In some implementations, functionality of the control system 106 may be partitioned between one or more controllers or processors, such as a dedicated sensor controller and an applications processor of a mobile device. According to some implementations, a portion of the control system 106 may reside in the optional temperature compensation module.

Some implementations of the apparatus 101 may include an interface system 104. In some examples, the interface system may include a wireless interface system. In some implementations, the interface system may include a user interface system, one or more network interfaces, one or more interfaces between the control system 106 and a memory system and/or one or more interfaces between the control system 106 and one or more external device interfaces (e.g., ports or applications processors).

The interface system 104 may be configured to provide communication (which may include wired or wireless communication, such as electrical communication, radio communication, etc.) between components of the apparatus 101. In some such examples, the interface system 104 may be configured to provide communication between the control system 106 and the ultrasonic sensor system 102. According to some such examples, a portion of the interface system 104 may couple at least a portion of the control system 106 to the ultrasonic sensor system 102, e.g., via electrically conducting material. If the apparatus 101 includes an temperature sensor 108 and/or a temperature compensation module 110, the interface system 104 may be configured to provide communication between at least a portion of the control system 106 and the temperature sensor 108 and/or the temperature compensation module 110. According to some examples, the interface system 104 may be configured to provide communication between the system and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces). In some implementations, the apparatus 101 may include a memory system. The interface system 104 may, in some examples, include at least one interface between the control system 106 and a memory system.

The apparatus 101 may be used in a variety of different contexts, many examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone or a tablet computer). The interface system 104 also may, in some such examples, reside in more than one device.

Figure 2:
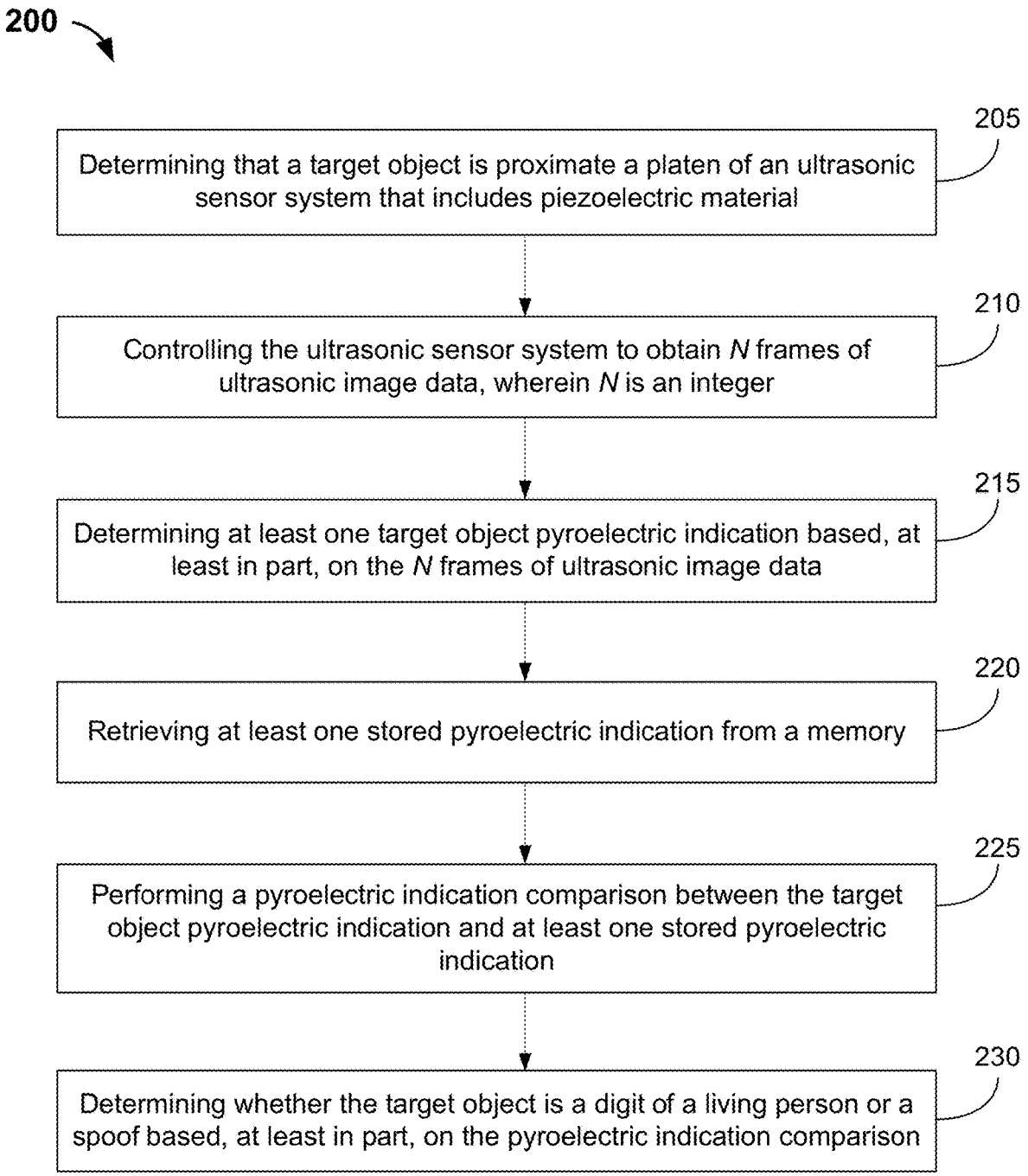
FIG. 2 is a flow diagram that provides examples of operations according to some disclosed methods.

FIG. 2 is a flow diagram that provides examples of operations according to some disclosed methods. The blocks of FIG. 2 (and those of other methods disclosed herein) may, for example, be performed by the apparatus 101 of FIG. 1C or by a similar apparatus. As with other methods disclosed herein, the method outlined in FIG. 2 may include more or fewer blocks than indicated. Moreover, the blocks of methods disclosed herein are not necessarily performed in the order indicated.

In this example, block 205 involves determining that a target object is proximate a platen of an ultrasonic sensor system that includes piezoelectric material. Block 205 may involve a control system receiving input from an ultrasonic sensor system. For example, block 205 may involve the control system 106 of FIG. 1C receiving input from the ultrasonic sensor system 102. However, in some examples block 205 may involve receiving input from another type of sensor, such as an optical sensor, a capacitive touch sensor, etc. Although not shown in FIG. 2, in some implementations method 200 may involve determining a temperature of the platen, e.g., from an internal temperature sensor of the apparatus 101.

According to this example, block 210 involves controlling the ultrasonic sensor system to obtain ultrasonic image data. For example, the control system may control the ultrasonic sensor system to obtain multiple frames of ultrasonic image data in block 201. Here, block 210 involves controlling the ultrasonic sensor system to obtain N frames of ultrasonic image data, wherein N is an integer. In some instances, block 210 may involve controlling the ultrasonic sensor system to obtain 2 or 3 frames of ultrasonic image data. In other examples, block 210 may involve controlling the ultrasonic sensor system to obtain 4, 5, 6 or 7 frames of ultrasonic image data. In still other examples, block 210 may involve controlling the ultrasonic sensor system to obtain 8 or more frames of ultrasonic image data, e.g., 10, 12 or 15 frames of ultrasonic image data. Accordingly, the value of N may vary according to the particular implementation. In some implementations, a temperature compensation module of the ultrasonic sensor system may be switched off while the N frames of ultrasonic image data are being obtained. Some implementations may involve smoothing the received frames of ultrasonic image data, e.g., by applying a smoothing filter.

Figure 3:
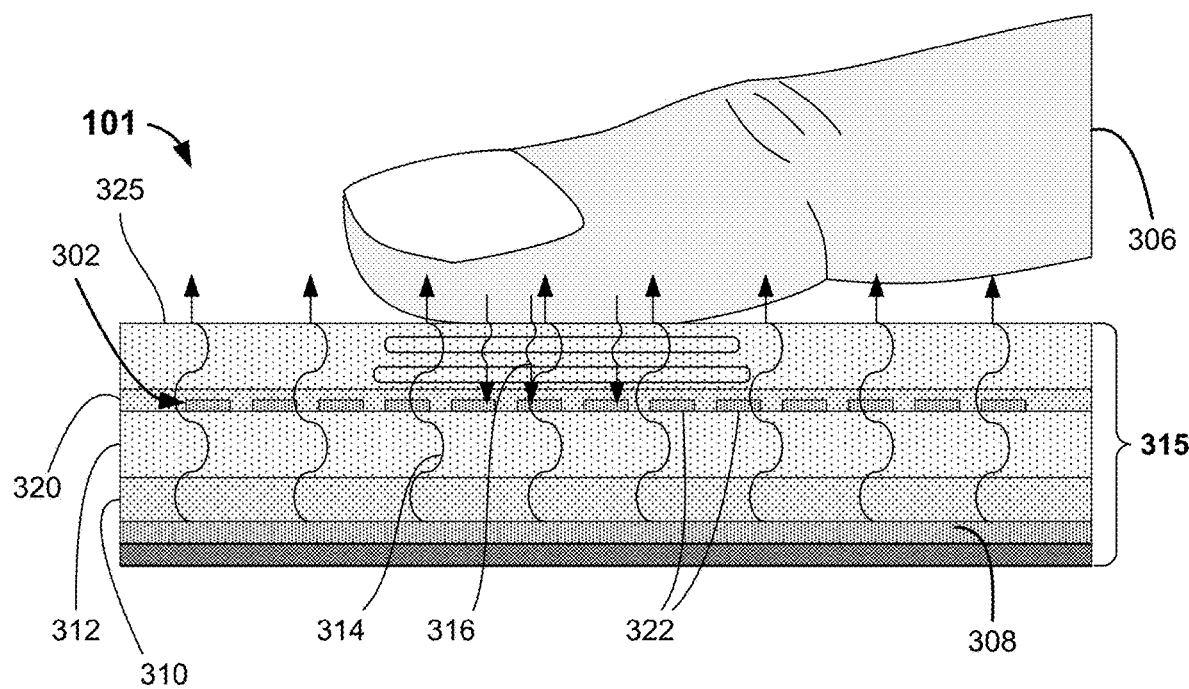
FIG. 3 shows an example of a cross-sectional view of an apparatus capable of performing at least some methods that are described herein.

FIG. 3 shows an example of a cross-sectional view of an apparatus capable of performing at least some methods that are described herein. For example, the apparatus 101 may be capable of performing the methods that are described herein with reference to FIG. 2. Here, the apparatus 101 is an example of the apparatus 101 that is described above with reference to FIG. 1C. As with other implementations shown and described herein, the types of elements, the arrangement of the elements and the dimensions of the elements illustrated in FIG. 3 are merely shown by way of example.

FIG. 3 shows an example of ultrasonic waves reflecting from a target object. In this example, the target object is a finger 306 being insonified by transmitted ultrasonic waves 314. This may, in some instances, be an example of controlling an ultrasonic sensor system to obtain N frames of ultrasonic image data in block 210 of FIG. 2. Prior to controlling an ultrasonic sensor system to obtain N frames of ultrasonic image data, the apparatus 101 may have determined that the finger 306, or at least some type of target object, was proximate the platen 325 (block 205). This determination may have been made according to input received from an ultrasonic sensor system, an optical sensor, a touch sensor, etc.

In the example shown in FIG. 3, the reflected ultrasonic waves 316 are transmitted by the ultrasonic transmitter 308 and received by at least a portion of the ultrasonic receiver array 302. Accordingly, in this example the ultrasonic waves are transmitted by an ultrasonic transmitter layer 308 that is separate from the ultrasonic receiver array 302. Therefore, in this example the ultrasonic sensor system 102 includes separate transmitter and receiver components. In the example shown in FIG. 3, the ultrasonic transmitter 308 can function as a plane-wave ultrasonic transmitter. In some implementations, the ultrasonic transmitter 308 may include a piezoelectric transmitter layer with transmitter excitation electrodes disposed on each side of the piezoelectric transmitter layer.

In some examples, ultrasonic receiver array 302 may include an array of pixel input electrodes and sensor pixels formed in part from TFT circuitry, an overlying piezoelectric receiver layer 320 of piezoelectric material such as PVDF or PVDF-TrFE, and an upper electrode layer positioned on the piezoelectric receiver layer, which will sometimes be referred to herein as a receiver bias electrode. Examples of suitable ultrasonic transmitters and ultrasonic receiver arrays are described below with reference to FIGS. 8A and 8B.

However, in alternative implementations, the ultrasonic receiver array 302 and the ultrasonic transmitter 308 may be combined in an ultrasonic transceiver array. For example, in some implementations, the ultrasonic sensor system 102 may include a piezoelectric receiver layer, such as a layer of PVDF polymer or a layer of PVDF-TrFE copolymer. In some such examples, a single piezoelectric layer may serve as the transmitter and as a receiver. In some implementations, other piezoelectric materials may be used in the piezoelectric layer, such as aluminum nitride (AlN) or lead zirconate titanate (PZT). The ultrasonic sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers.

In this example, the transmitted ultrasonic waves 314 have been transmitted from the ultrasonic transmitter 308 through a sensor stack 315 and into an overlying finger 306. The various layers of the sensor stack 315 may, in some examples, include one or more substrates of glass or other material (such as plastic or sapphire) that is substantially transparent to visible light. In this example, the sensor stack 315 includes a substrate 310.

In this implementation, the substrate 310 is coupled to a thin-film transistor (TFT) substrate 312 for the ultrasonic receiver array 302. According to this example, a piezoelectric receiver layer 320 overlies the sensor pixels 322 of the ultrasonic receiver array 302 and a platen 325 overlies the piezoelectric receiver layer 320. Accordingly, in this example the apparatus 101 is capable of transmitting the ultrasonic waves 314 through one or more substrates of the sensor stack 315 that includes the ultrasonic receiver array 302 with substrate 312 and the platen 325 that may also be viewed as a substrate. In some implementations, sensor pixels 322 of the ultrasonic receiver array 302 may be transparent, partially transparent or substantially transparent, such that the apparatus 101 may be capable of transmitting light from a light source system through elements of the ultrasonic sensor system 102. In some implementations, the ultrasonic receiver array 302 and associated circuitry may be formed on or in a glass, plastic or silicon substrate.

Figure 4:
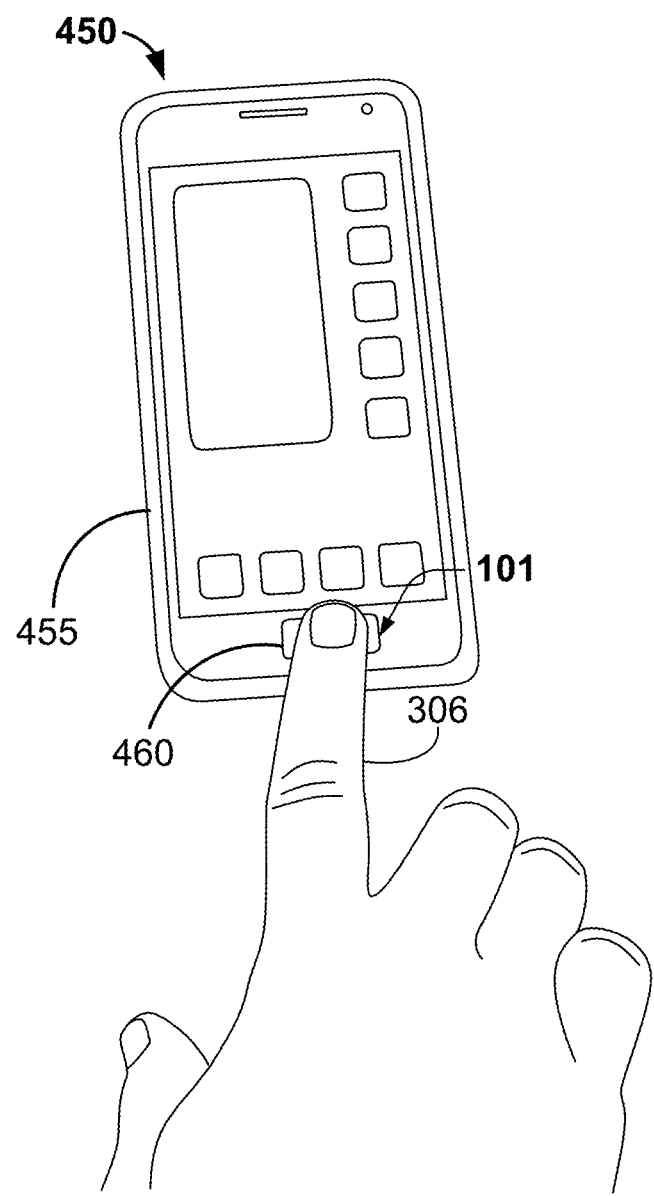
FIG. 4 shows an example of a mobile device that includes a biometric system as disclosed herein.

FIG. 4 shows an example of a mobile device that includes a biometric system as disclosed herein. In this example, the mobile device 450 is a smartphone. However, in alternative examples the mobile device 450 may another type of mobile device, such as a mobile health device, such as a mobile drug delivery device, a wearable device, a tablet computer, etc.

In this example, the mobile device 450 includes an instance of the apparatus 101 that is described above with reference to FIG. 1C. In this example, the apparatus 101 is disposed, at least in part, within the mobile device enclosure 455. According to this example, at least a portion of the apparatus 101 is located in the portion of the mobile device 450 that is shown being touched by the finger 306, which corresponds to the location of button 460. Accordingly, the button 460 may be an ultrasonic button. In some implementations, the button 460 may serve as a home button. In some implementations, the button 460 may serve as an ultrasonic authenticating button, with the ability to turn on or otherwise wake up the mobile device 450 when touched or pressed and/or to authenticate or otherwise validate a user when applications running on the mobile device (such as a wake-up function) warrant such a function.

In this implementation, the mobile device 450 may be capable of performing a user authentication process. For example, a control system of the mobile device 450 may be capable of comparing attribute information obtained from image data received via an ultrasonic sensor system of the apparatus 101 with stored attribute information obtained from image data that has previously been received from an authorized user. In some examples, the attribute information obtained from the received image data and the stored attribute information may include attribute information corresponding to fingerprint features, sub-epidermal features, muscle tissue features and/or bone tissue features.

According to some implementations, the attribute information obtained from the received image data and the stored attribute information may include information regarding fingerprint minutia or keypoints. In some such implementations, the user authentication process may involve evaluating information regarding the fingerprint minutia as well as at least one other type of attribute information, such as attribute information corresponding to sub-epidermal features. According to some such examples, the user authentication process may involve evaluating information regarding the fingerprint minutia or keypoints as well as attribute information corresponding to vascular features. For example, attribute information obtained from a received image of blood vessels in the finger may be compared with a stored image of blood vessels in the authorized user's finger 306.

Returning to FIG. 2, in this example block 215 involves determining what will be referred to herein as a "target object pyroelectric indication" based, at least in part, on the N frames of ultrasonic image data. As used herein, a "target object pyroelectric indication" may refer to any one of a variety of different pyroelectric effects that a target object may induce in piezoelectric material of the ultrasonic sensor system. In some examples, the target object pyroelectric indication may correspond to the number of pixels corresponding to signals that are above a threshold value. According to some such examples, the target object pyroelectric indication may correspond to a slope of an accumulated number of pixels corresponding to signals that are above the threshold value. In some such examples, the target object pyroelectric indication may correspond to a sum of a number of pixels corresponding to signals that are above the threshold value.

Figure 5:
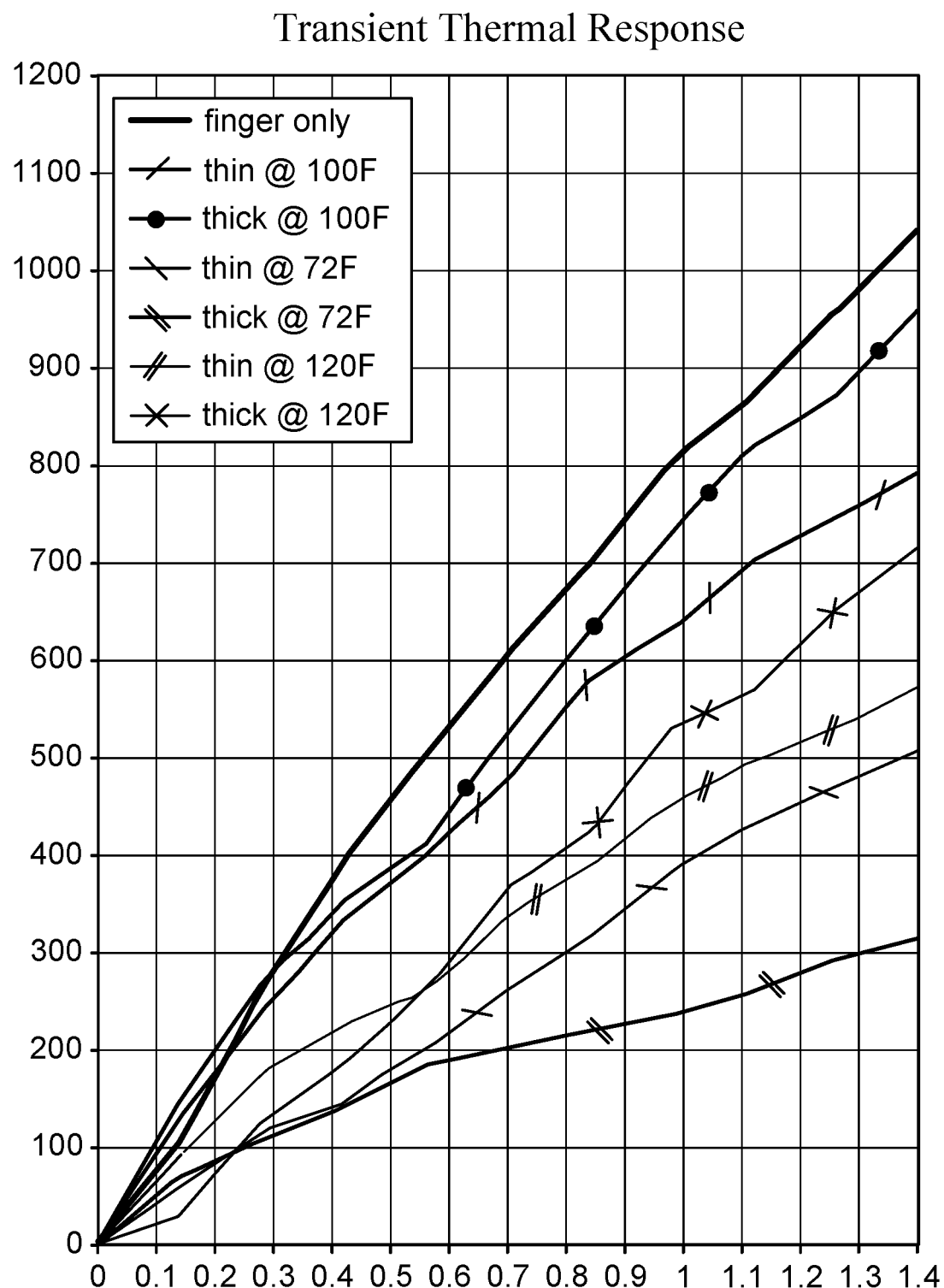
FIG. 5 is a graph that shows various examples of target object pyroelectric indications that are based on multiple frames of ultrasonic image data.

FIG. 5 is a graph that shows various examples of target object pyroelectric indications that are based on multiple frames of ultrasonic image data. In the examples shown in FIG. 5, the vertical axis of the graph corresponds to an accumulated number (a sum) of ultrasonic sensor pixels corresponding to ultrasonic image data received from various target objects, including a finger, sleeve-type spoofs (labeled "thin" in FIG. 5) and solid, "fake finger" spoofs (labeled "thick" in FIG. 5). In this example, the vertical axis of the graph corresponds to an accumulated number of ultrasonic sensor pixels from which signals that are above a threshold value have been received. In alternative examples, the vertical axis of the graph may correspond to a sum of the mean value of each frame of ultrasonic sensor pixels, e.g., the mean value of ultrasonic sensor pixels corresponding to a target object contact area. According to this example, the initial platen temperature was 22 degrees Celsius.

Here, the horizontal axis of the graph corresponds to time, in seconds. The horizontal axis of the graph may correspond to differing numbers of frames, depending on the time interval between frames, the duration of time required for a complete scan of the ultrasonic sensor system, etc. In some implementations, ultrasonic image data may be obtained at time intervals of between 70 and 80 milliseconds, whereas in other examples ultrasonic image data may be obtained at time intervals of 40 milliseconds, 50 milliseconds, 60 milliseconds, 90 milliseconds, 100 milliseconds, 110 milliseconds, 120 milliseconds, etc.

According to some examples, the values obtained in the first frame (in other words, a frame during which a target object touch is detected or the first frame after a target object touch has been detected) are not counted in the accumulated number of pixels indicated on the vertical axis. Instead, these first frame image values may be subtracted from the total. In some implementations, a temperature compensation module of the ultrasonic sensor system may be switched off while the N frames of ultrasonic image data are being obtained. Moreover, in some examples, only pixels corresponding to an area of the ultrasonic sensor system proximate the target object are included in the evaluation process. According to some such examples, the values obtained in a background portion of the frame (which may be referred to herein as a "background image") are not counted in the accumulated number of pixels indicated on the vertical axis. Instead, these background \image values may be subtracted from the total.

According to this example, it may be observed that after approximately 0.2 seconds, the pyroelectric indication of the finger can be distinguished from that of most spoofs. In this example, the sum of the number of pixels corresponding to signals that are above the threshold value and the instantaneous slope of the accumulated number of pixels over time are both somewhat different for the finger, as compared to the same values for all spoofs. Only the spoofs that have been pre-heated to a temperature at or above a normal human body temperature have similar pyroelectric indications after approximately 0.2 seconds. After approximately 0.4 seconds or 0.5 seconds, the pyroelectric indications of the finger can be readily distinguished from that of all types of spoofs that were evaluated in this example. In this example, the sum of the number of pixels corresponding to signals that are above the threshold value, the instantaneous slope of the accumulated number of pixels over time and the average slope of the accumulated number of pixels over time are all markedly different after approximately 0.4 seconds or 0.5 seconds.

In the example shown in FIG. 2, block 220 involves retrieving at least one stored pyroelectric indication from a memory. Block 220 may, in some instances, involve retrieving at least one stored pyroelectric indication from a memory of a control system or from a memory accessible by the control system. The stored pyroelectric indication(s) may, in some examples, correspond to one or more stored pyroelectric indications that have been previously determined during experiments, which may involve varying temperature conditions. Some examples are described below. In some alternative examples, the stored pyroelectric indication(s) may correspond to one or more stored pyroelectric indications that were provided by an authorized user during an enrollment process.

In some examples, block 220 may involve retrieving multiple pyroelectric indications from a memory. The stored pyroelectric indications may vary according to the particular implementation. In some examples, the stored pyroelectric indications may be, or may include, a value corresponding to a sum of a number of pixels for which signals that are above the threshold value have been received after a particular time. Alternatively, or additionally, the stored pyroelectric indications may include a value corresponding to an instantaneous slope, at a particular time, of accumulated pixels over time and/or to a value corresponding to an average slope, for a time interval, of accumulated pixels over time.

In alternative examples, the stored pyroelectric indications may be, or may include, information for defining a shape of a curve. According to some implementations, the stored pyroelectric indications may be, or may include, information for defining a shape of a curve via multiple points in a coordinate system that defines an accumulated pixel value/time space. In some examples, the stored pyroelectric indications may be, or may include, information for defining a shape of a "finger only" curve, e.g., as shown in FIG. 5. In some such examples, the stored pyroelectric indications may be, or may include, information for defining a shape of a "finger only" curve corresponding to a particular initial platen temperature and/or a particular initial finger temperature. Some examples are described below.

According to this example, block 225 involves performing a pyroelectric indication comparison between the target object pyroelectric indication and at least one stored pyroelectric indication. For example, block 225 may involve a control system determining whether a stored pyroelectric indication matches a current target object pyroelectric indication. Block 225 may involve a control system determining whether a difference between the stored pyroelectric indication and the current target object pyroelectric indication is within a threshold value, whether an average difference between multiple stored pyroelectric indications and multiple current target object pyroelectric indications is within a threshold value, etc. Here, block 230 involves determining whether the target object is a digit of a living person or a spoof based, at least in part, on the pyroelectric indication comparison.

Figure 6A:
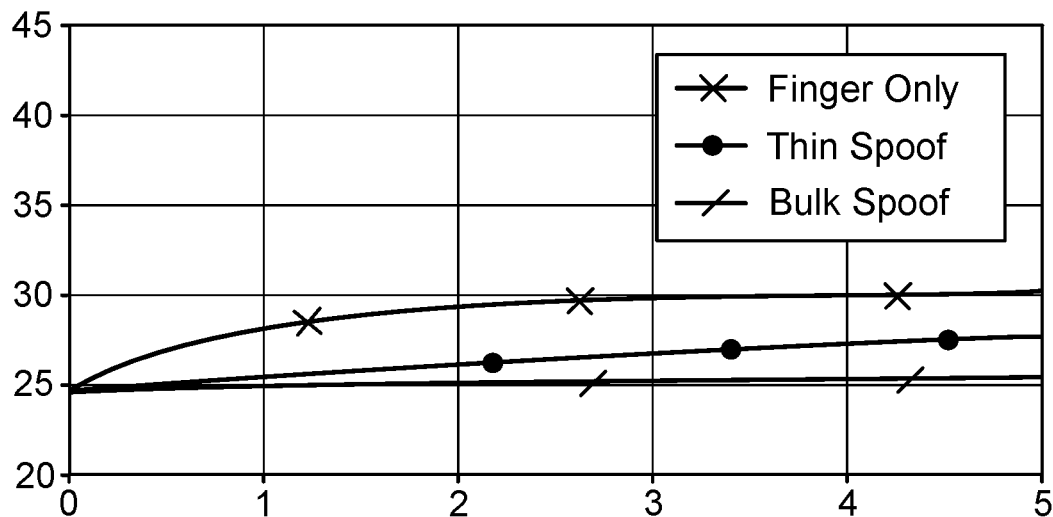
FIGS. 6A-6C show examples of temperature responses to target objects for three different initial platen temperatures.
Figure 6B:
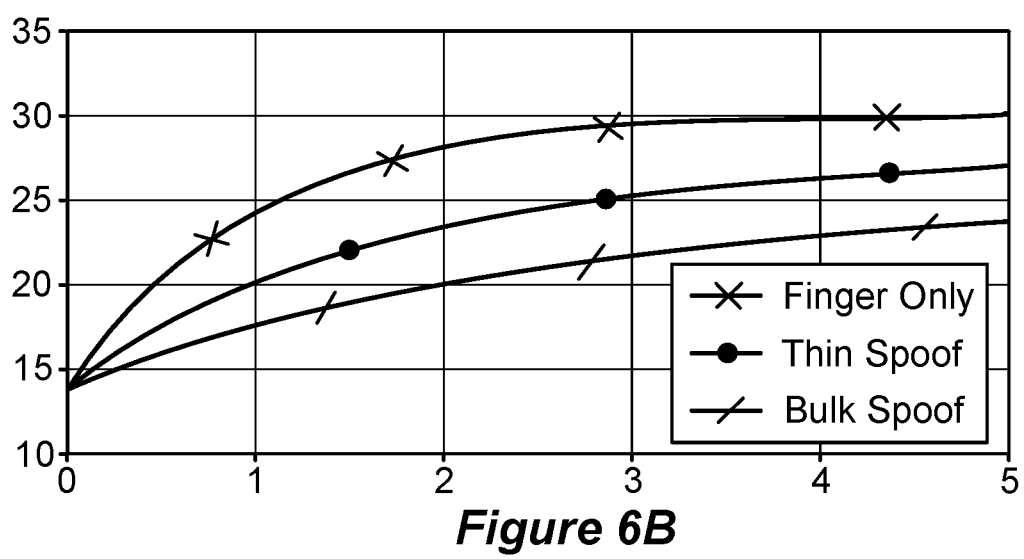
Figure 6C:
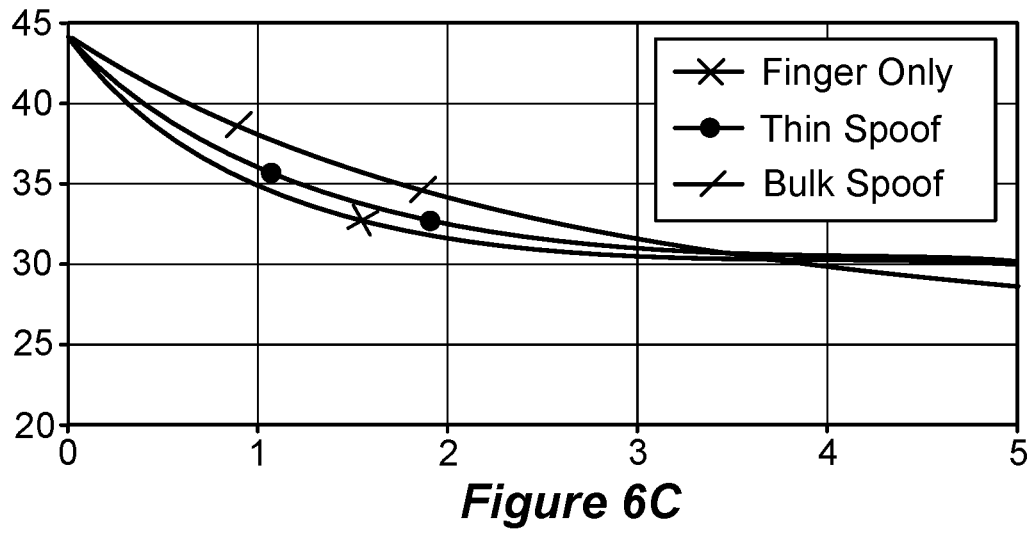

Pyroelectric indications may vary according to the relative temperatures of the target object and the platen. FIGS. 6A-6C show examples of temperature responses to target objects for three different initial platen temperatures. In each example, temperature changes of a platen in response to a finger, a sleeve-type spoof and a solid spoof are shown. Each example shows the temperature in Celsius on the vertical axis and time in seconds on the horizontal axis. Because of the relationship between pyroelectric indications and temperature changes of a platen, each example corresponds to different pyroelectric indications.

FIG. 6A is a graph that shows the changes in temperature of a platen at an initial temperature of 25 degrees, which is intended to represent a typical "room temperature" scenario. In this example, the spoofs both start at room temperature. In this example, the finger causes much more rapid temperature changes to the platen, which are readily distinguishable from the temperature changes caused by the thin and thick spoofs. The relatively more rapid temperature changes to the platen caused by the finger will cause a relatively larger number of pixels of the ultrasonic sensor system to receive signals that are above a threshold value, within a given time interval. Therefore, the relatively more rapid temperature changes to the platen caused by the finger will produce pyroelectric indications that are readily distinguishable from those caused by the thin or thick spoofs.

FIG. 6B is a graph that shows the changes in temperature of a platen at an initial temperature of 15 degrees, which is intended to represent a cold platen scenario. In this example, the spoofs both start at room temperature. In this example, the finger causes more rapid temperature changes to the platen, which are easily distinguishable from the temperature changes to the platen caused by the thin and thick spoofs. The relatively more rapid temperature changes to the platen caused by the finger will produce pyroelectric indications that are readily distinguishable from those caused by the thin or thick spoofs.

FIG. 6C is a graph that shows the changes in temperature of a platen at an initial temperature of 43.7 degrees. In this example, the spoofs both start at 32.5 degrees, which approximates the temperature of a human body. In this example, the finger causes somewhat more rapid temperature changes to the platen, which are easily distinguishable from the temperature changes to the platen caused by thick spoof. Although the temperature changes caused by the thin spoof are similar, both the slope and the overall values of the temperature changes caused by the finger are still distinguishable.

In view of experimental results such as those shown in FIGS. 6A-6C, some implementations involve adjusting or "normalizing" a target object pyroelectric indication according to the platen temperature and/or according to a temperature difference between the platen temperature and a finger temperature. In some implementations, the finger temperature is assumed to be a constant, e.g. 32.5 degrees Celsius. In alternative implementations, the finger temperature is assumed to vary at least slightly according to ambient temperatures, e.g., to increase by 1 or 2 degrees Celsius above a baseline temperature when the ambient temperature is relatively hot (e.g., above 30 degrees, above 35 degrees, etc.) and/or to decrease by 1 or 2 degrees Celsius below a baseline temperature when the ambient temperature is relatively cold (e.g., below 10 degrees, below 5 degrees, etc.).

Some implementations may involve using a reference temperature for the platen, e.g., 22.5 degrees. Some such implementations may involve determining a reference temperature difference ($\Delta T_{ref}$) between a reference finger temperature and the reference platen temperature, e.g., $\Delta T_{ref}$=(32.5−22.5=10) degrees. A current temperature difference ($\Delta T$) may be determined between the current finger temperature and the current temperature of the platen, e.g., ΔT=(32.5−24.5=8) degrees. A normalizing value NV may be determined according to ΔT/ΔT$_{ref}$, e.g., NV=8/10=0.8.

According to some such implementations, a slope corresponding to a target object pyroelectric indication may be normalized according to the normalizing value, e.g., by dividing the measured slope by NV. For example, the instantaneous slope S after receiving N frames of ultrasonic image data may be calculated as:

$$S=(A_N-A_{N-1})/\Delta t \quad \text{(Equation 1)}$$

In Equation 1, $A_N$ represents the accumulated number of pixels corresponding to signals above a threshold value after receiving N frames of ultrasonic image data, $A_{N-1}$ represents the accumulated number of pixels corresponding to signals above a threshold value after receiving N−1 frames of ultrasonic image data and Δt represents a time interval between receiving the (N−1)$^{th}$ frame and receiving the N$^{th}$ frame. The temperature-normalized slope $S_N$ may be calculated as $S_N$=S/NV For instance, if S were determined to be 3, and NV were 0.8, as in the above example, the temperature-normalized slope $S_N$ may be calculated as $S_N$=3/0.8=3.75.

Figure 7:
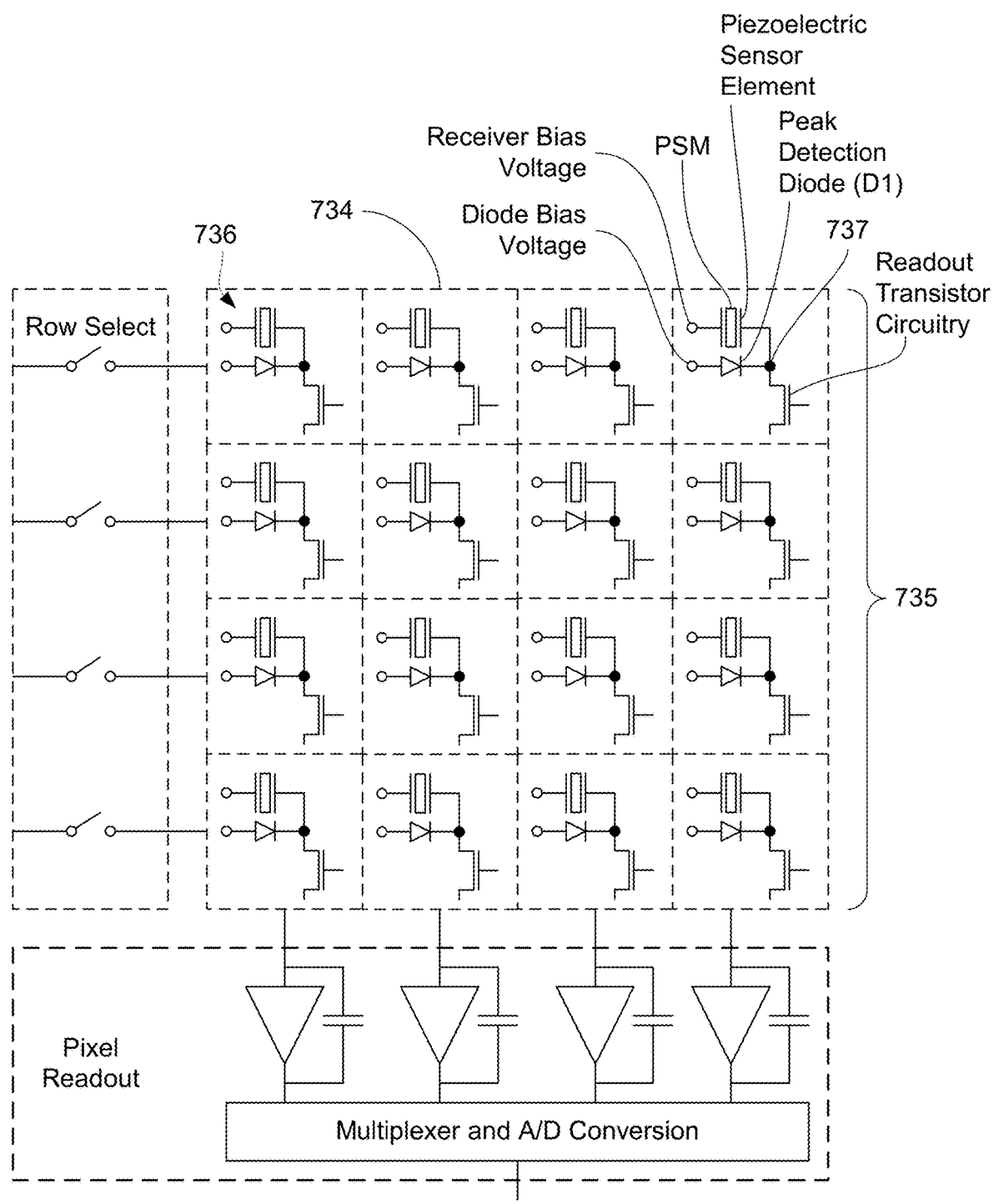
FIG. 7 representationally depicts aspects of a 4×4 pixel array of sensor pixels for an ultrasonic sensor system.

FIG. 7 representationally depicts aspects of a 4×4 pixel array of sensor pixels for an ultrasonic sensor system. Each pixel 734 may be, for example, associated with a local region of piezoelectric sensor material (PSM), a peak detection diode (D1) and a readout transistor (M3); many or all of these elements may be formed on or in a substrate to form the pixel circuit 736. In practice, the local region of piezoelectric sensor material of each pixel 734 may transduce received ultrasonic energy into electrical charges. The peak detection diode D1 may register the maximum amount of charge detected by the local region of piezoelectric sensor material PSM. Each row of the pixel array 735 may then be scanned, e.g., through a row select mechanism, a gate driver, or a shift register, and the readout transistor M3 for each column may be triggered to allow the magnitude of the peak charge for each pixel 734 to be read by additional circuitry, e.g., a multiplexer and an A/D converter. The pixel circuit 736 may include one or more TFTs to allow gating, addressing, and resetting of the pixel 734.

Each pixel circuit 736 may provide information about a small portion of the object detected by the ultrasonic sensor system. While, for convenience of illustration, the example shown in FIG. 7 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the target object.

Figure 8A:
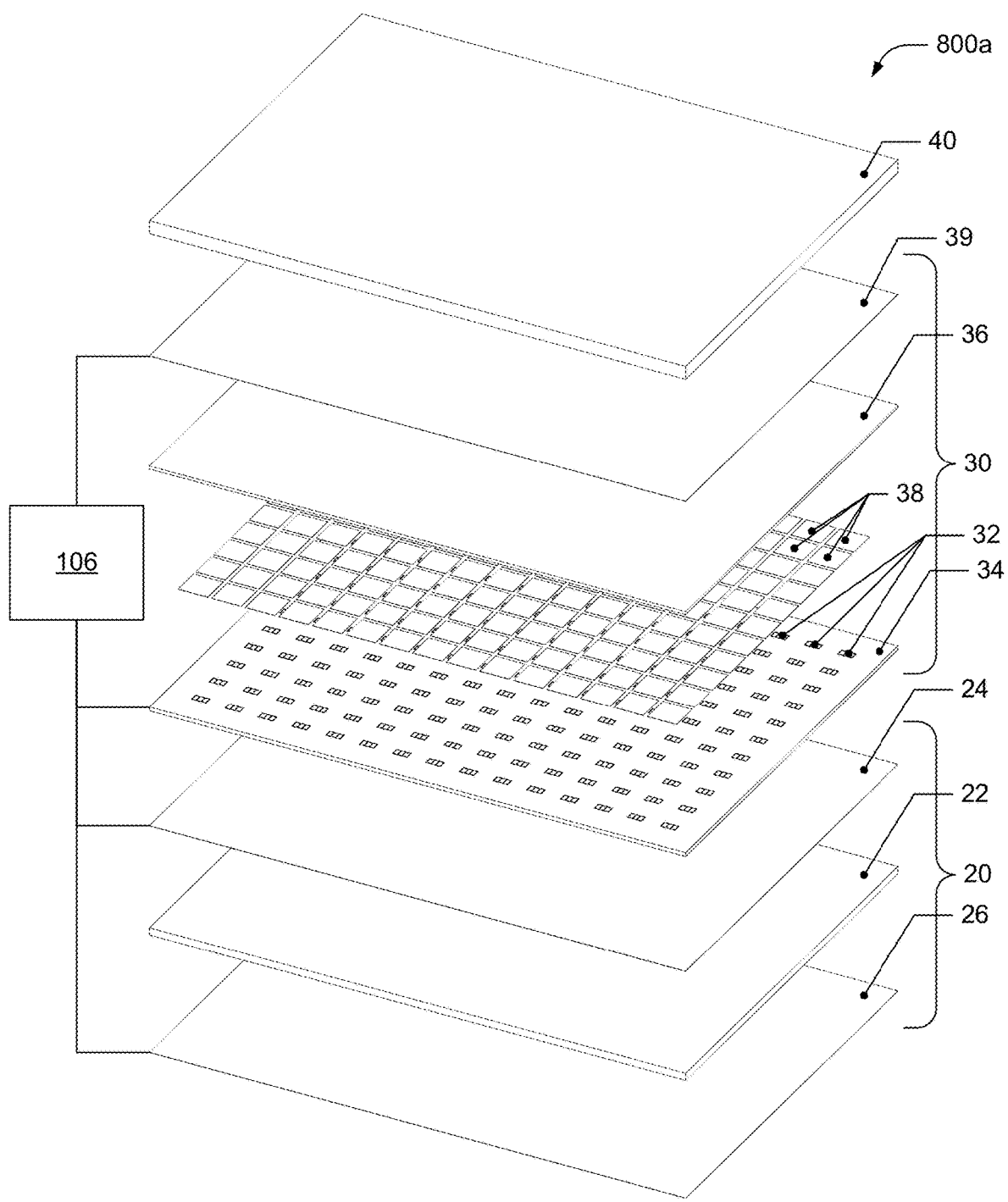
FIGS. 8A and 8B show example arrangements of ultrasonic transmitters and receivers in an ultrasonic sensor system, with other arrangements being possible.

FIG. 8A shows an example of an exploded view of an ultrasonic sensor system. In this example, the ultrasonic sensor system 800*a* includes an ultrasonic transmitter 20 and an ultrasonic receiver 30 under a platen 40. According to some implementations, the ultrasonic receiver 30 may be an example of the ultrasonic sensor system 102 that is shown in FIG. 1B and described above. In some implementations, the ultrasonic transmitter 20 may be an example of the optional temperature sensor 108 that is shown in FIG. 1B and described above. The ultrasonic transmitter 20 may include a substantially planar piezoelectric transmitter layer 22 and may be capable of functioning as a plane wave generator. Ultrasonic waves may be generated by applying a voltage to the piezoelectric layer to expand or contract the layer, depending upon the signal applied, thereby generating a plane wave. In this example, the control system 106 may be capable of causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This ultrasonic wave may travel towards a finger (or other object to be detected), passing through the platen 40. A portion of the wave not absorbed or transmitted by the object to be detected may be reflected so as to pass back through the platen 40 and be received by at least a portion of the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT elements, electrical interconnect traces and, in some implementations, one or more additional circuit elements such as diodes, capacitors, and the like. Each sensor pixel circuit 32 may be configured to convert an electric charge generated in the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into localized electrical charges by the piezoelectric receiver layer 36. These localized charges may be collected by the pixel input electrodes 38 and passed on to the underlying sensor pixel circuits 32. The charges may be amplified or buffered by the sensor pixel circuits 32 and provided to the control system 106.

The control system 106 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 106 may operate substantially as described above. For example, the control system 106 may be capable of processing the amplified signals received from the sensor pixel circuits 32.

The control system 106 may be capable of controlling the ultrasonic transmitter 20 and/or the ultrasonic receiver 30 to obtain ultrasonic image data, e.g., by obtaining fingerprint images. Whether or not the ultrasonic sensor system 800*a* includes an ultrasonic transmitter 20, the control system 106 may be capable of obtaining attribute information from the ultrasonic image data. In some examples, the control system 106 may be capable of controlling access to one or more devices based, at least in part, on the attribute information. The ultrasonic sensor system 800*a* (or an associated device) may include a memory system that includes one or more memory devices. In some implementations, the control system 106 may include at least a portion of the memory system. The control system 106 may be capable of obtaining attribute information from ultrasonic image data and storing the attribute information in the memory system. In some implementations, the control system 106 may be capable of capturing a fingerprint image, obtaining attribute information from the fingerprint image and storing attribute information obtained from the fingerprint image (which may be referred to herein as fingerprint image information) in the memory system. According to some examples, the control system 106 may be capable of capturing a fingerprint image, obtaining attribute information from the fingerprint image and storing attribute information obtained from the fingerprint image even while maintaining the ultrasonic transmitter 20 in an "off" state.

In some implementations, the control system 106 may be capable of operating the ultrasonic sensor system 800*a* in an ultrasonic imaging mode or a force-sensing mode. In some implementations, the control system may be capable of maintaining the ultrasonic transmitter 20 in an "off" state when operating the ultrasonic sensor system in a force-sensing mode. The ultrasonic receiver 30 may be capable of functioning as a force sensor when the ultrasonic sensor system 800*a* is operating in the force-sensing mode. In some implementations, the control system 106 may be capable of controlling other devices, such as a display system, a communication system, etc. In some implementations, the control system 106 may be capable of operating the ultrasonic sensor system 800*a* in a capacitive imaging mode.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is capable of imaging fingerprints in a force detection mode or a capacitance detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF planar piezoelectric transmitter layer 22 is approximately 28 μm thick and a PVDF-TrFE receiver layer 36 is approximately 12 μm thick. Example frequencies of the ultrasonic waves may be in the range of 5 MHz to 30 MHz, with wavelengths on the order of a millimeter or less.

Figure 8B:
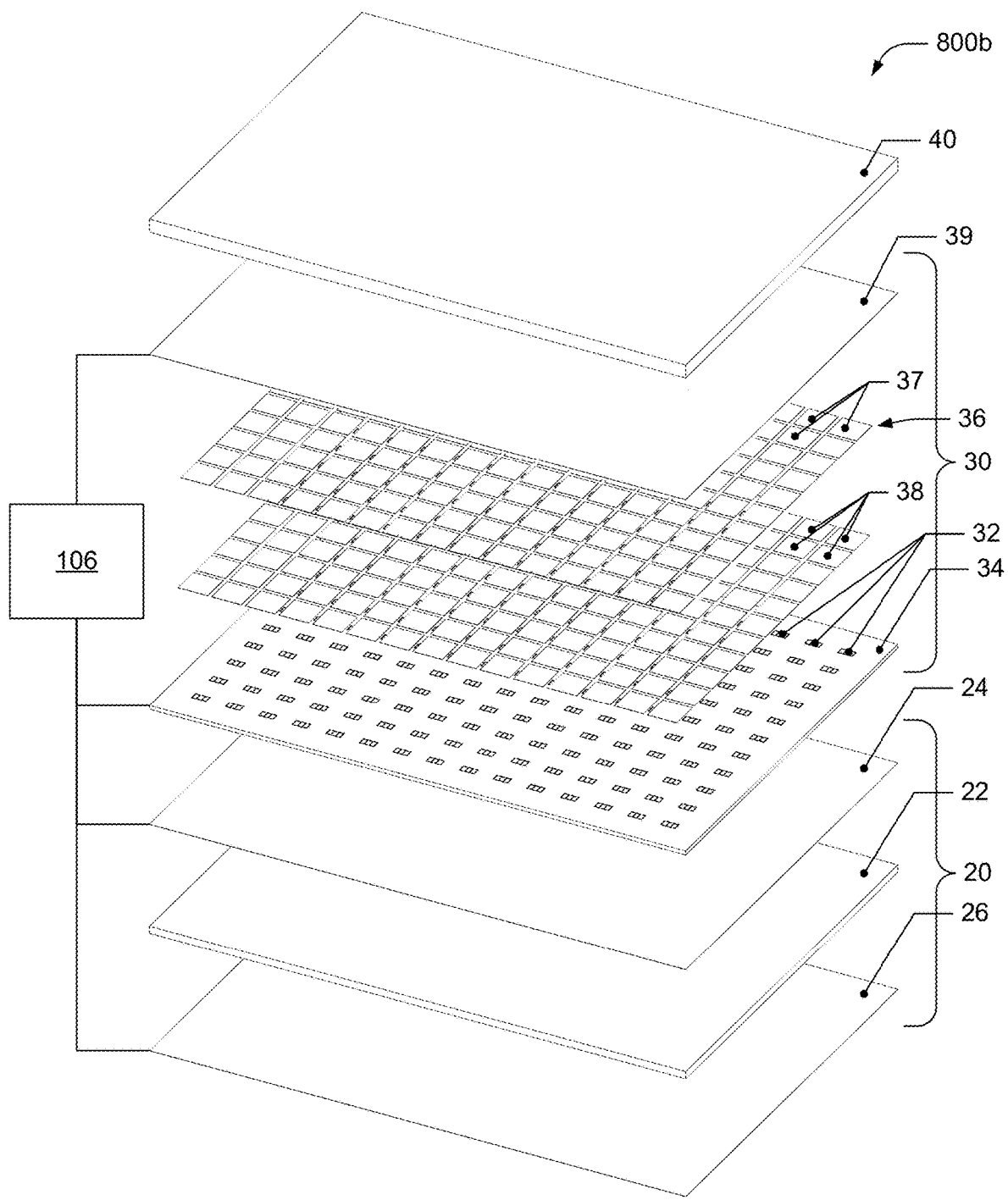

FIG. 8B shows an exploded view of an alternative example of an ultrasonic sensor system. In this example, the piezoelectric receiver layer 36 has been formed into discrete elements 37. In the implementation shown in FIG. 8B, each of the discrete elements 37 corresponds with a single pixel input electrode 38 and a single sensor pixel circuit 32. However, in alternative implementations of the ultrasonic sensor system 800*b*, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 8A and 8B show example arrangements of ultrasonic transmitters and receivers in an ultrasonic sensor system, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor system (e.g., a single-layer transmitter and receiver). In some implementations, the ultrasonic sensor system may include an acoustic delay layer. For example, an acoustic delay layer may be incorporated into the ultrasonic sensor system between the ultrasonic transmitter 20 and the ultrasonic receiver 30. An acoustic delay layer may be employed to adjust, the ultrasonic pulse timing, and at the same time electrically, insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic sensor system is arriving at the ultrasonic receiver 30. In some implementations, the substrate 34 and/or the platen 40 may serve as an acoustic delay layer.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:
1. A method of liveness detection, comprising:
   determining that a target object is proximate a platen of an ultrasonic sensor system that includes piezoelectric material;
   controlling the ultrasonic sensor system to obtain N frames of ultrasonic image data, wherein N is an integer;
   determining at least one target object pyroelectric indication based, at least in part, on the N frames of ultrasonic image data;
   retrieving at least one stored pyroelectric indication from a memory;
   performing a pyroelectric indication comparison between the target object pyroelectric indication and at least one stored pyroelectric indication; and
   determining whether the target object is a digit of a living person or a spoof based, at least in part, on the pyroelectric indication comparison.

2. The method of claim 1, wherein the target object pyroelectric indication corresponds to a number of pixels in each of the N frames of ultrasonic image data, the number of pixels corresponding to signals that are above a threshold value.

3. The method of claim 1, wherein the target object pyroelectric indication corresponds to a slope of an accumulated number of pixels in each of the N frames of ultrasonic image data, the number of pixels corresponding to signals that are above a threshold value.

4. The method of claim 1, wherein the target object pyroelectric indication corresponds to a sum of a number of pixels in each of the N frames of ultrasonic image data, the number of pixels corresponding to signals that are above a threshold value.

5. The method of claim 1, wherein N is between 2 and 7.

6. The method of claim 1, further comprising determining a platen temperature.

7. The method of claim 6, wherein the target object pyroelectric indication corresponds to a normalized slope of an accumulated number of pixels in each of the N frames of ultrasonic image data, the number of pixels corresponding to signals that are above a threshold value, and wherein the normalized slope is based, at least in part, on the platen temperature.

8. The method of claim 1, further comprising switching off a temperature compensation module of the ultrasonic sensor system before obtaining the N frames of ultrasonic image data.

9. The method of claim 1, wherein the target object pyroelectric indication is based on a target object portion of the N frames of ultrasonic image data that correspond to the target object.

10. The method of claim 9, wherein the target object pyroelectric indication is based on a mean signal value of pixels in the target object portion.

11. The method of claim 1, further comprising subtracting at least one of a background image or a first frame image from second through $N^{th}$ frames of ultrasonic image data.

12. An apparatus, comprising:
an ultrasonic sensor system that includes piezoelectric material and a platen; and
a control system, at least part of the control system being configured for electrical communication with the ultrasonic sensor system, the control system being further configured for:
determining that a target object is proximate the platen of the ultrasonic sensor system;
controlling the ultrasonic sensor system to obtain N frames of ultrasonic image data, wherein N is an integer;
determining at least one target object pyroelectric indication based, at least in part, on the N frames of ultrasonic image data;
retrieving at least one stored pyroelectric indication from a memory;
performing a pyroelectric indication comparison between the target object pyroelectric indication and at least one stored pyroelectric indication; and
determining whether the target object is a digit of a living person or a spoof based, at least in part, on the pyroelectric indication comparison.

13. The apparatus of claim 12, wherein the target object pyroelectric indication corresponds to a number of pixels in each of the N frames of ultrasonic image data, the number of pixels corresponding to signals that are above a threshold value.

14. The apparatus of claim 12, wherein the target object pyroelectric indication corresponds to a slope of an accumulated number of pixels in each of the N frames of ultrasonic image data, the number of pixels corresponding to signals that are above a threshold value.

15. The apparatus of claim 12, wherein the target object pyroelectric indication corresponds to a sum of a number of pixels in each of the N frames of ultrasonic image data, the number of pixels corresponding to signals that are above a threshold value.

16. The apparatus of claim 12, wherein N is between 2 and 7.

17. The apparatus of claim 12, wherein the N frames of ultrasonic image data are obtained at time intervals of between 70 and 80 milliseconds.

18. The apparatus of claim 12, further comprising a temperature sensor configured for determining at least one of a platen temperature or an ultrasonic sensor system temperature.

19. The apparatus of claim 12, wherein the ultrasonic sensor system comprises a temperature compensation module and wherein the control system is further configured for switching off the temperature compensation module before obtaining the N frames of ultrasonic image data.

20. The apparatus of claim 12, wherein the target object pyroelectric indication is based on a target object portion of the N frames of ultrasonic image data that correspond to the target object.

21. The apparatus of claim 20, wherein the target object pyroelectric indication is based on a mean signal value of pixels in the target object portion.

22. The apparatus of claim 12, wherein the control system is further configured for subtracting at least one of a background image or a first frame image from second through $N^{th}$ frames of ultrasonic image data.

23. The apparatus of claim 12, wherein the control system comprises one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

24. One or more non-transitory media having software stored thereon, the software including instructions for controlling one or more devices to perform a method of liveness detection, the method comprising:
determining that a target object is proximate a platen of an ultrasonic sensor system that includes piezoelectric material;
controlling the ultrasonic sensor system to obtain N frames of ultrasonic image data, wherein N is an integer;
determining at least one target object pyroelectric indication based, at least in part, on the N frames of ultrasonic image data;
retrieving at least one stored pyroelectric indication from a memory;
performing a pyroelectric indication comparison between the target object pyroelectric indication and at least one stored pyroelectric indication; and
determining whether the target object is a digit of a living person or a spoof based, at least in part, on the pyroelectric indication comparison.

25. The one or more non-transitory media of claim 24, wherein the target object pyroelectric indication corresponds to a number of pixels in each of the N frames of ultrasonic image data, the number of pixels corresponding to signals that are above a threshold value.

26. The one or more non-transitory media of claim 24, wherein the target object pyroelectric indication corresponds to a slope of an accumulated number of pixels in each of the N frames of ultrasonic image data, the number of pixels corresponding to signals that are above a threshold value.

27. The one or more non-transitory media of claim 24, wherein the target object pyroelectric indication corresponds to a sum of a number of pixels in each of the N frames of ultrasonic image data, the number of pixels corresponding to signals that are above a threshold value.

28. The one or more non-transitory media of claim 24, wherein the method further comprises switching off a temperature compensation module of the ultrasonic sensor system before obtaining the N frames of ultrasonic image data.

29. An apparatus, comprising:
an ultrasonic sensor system that includes piezoelectric material and a platen; and
control means for electrical communication with the ultrasonic sensor system, the control system further comprising means for:
determining that a target object is proximate a platen of an ultrasonic sensor system that includes piezoelectric material;
controlling the ultrasonic sensor system to obtain N frames of ultrasonic image data, wherein N is an integer;
determining at least one target object pyroelectric indication based, at least in part, on the N frames of ultrasonic image data;
retrieving at least one stored pyroelectric indication from a memory;
performing a pyroelectric indication comparison between the target object pyroelectric indication and at least one stored pyroelectric indication; and
determining whether the target object is a digit of a living person or a spoof based, at least in part, on the pyroelectric indication comparison.

30. The apparatus of claim 29, wherein the target object pyroelectric indication corresponds to a number of pixels in each of the N frames of ultrasonic image data, the number of pixels corresponding to signals that are above a threshold value.

* * * * *